(12) United States Patent
Li et al.

(10) Patent No.: US 8,057,199 B2
(45) Date of Patent: Nov. 15, 2011

(54) CENTRIFUGAL DRAINAGE PUMP WITH SHOCK ABSORBING COUPLING ARRANGMENT

(75) Inventors: Mingxue Li, Jiangmen (CN); Huashan Shi, Jiangmen (CN)

(73) Assignee: Jiangmen Idear Hanyu Electrical (CN)

( * ) Notice: Subject to any disclaimer, the term of this patent is extended or adjusted under 35 U.S.C. 154(b) by 651 days.

(21) Appl. No.: 12/064,402

(22) PCT Filed: May 29, 2006

(86) PCT No.: PCT/CN2006/001124
§ 371 (c)(1),
(2), (4) Date: Feb. 21, 2008

(87) PCT Pub. No.: WO2007/085141
PCT Pub. Date: Aug. 2, 2007

(65) Prior Publication Data
US 2008/0219864 A1    Sep. 11, 2008

(30) Foreign Application Priority Data

Jan. 26, 2006 (CN) .................. 2006 2 0554699 U (51) Int. Cl.
*F04B 39/00* (2006.01)
*F16D 3/14* (2006.01)
(52) U.S. Cl. .......... 417/423.1; 417/326; 464/74; 464/83
(58) Field of Classification Search ............... 417/410.4, 417/319, 326, 22, 423.1; 310/273; 464/43, 464/74, 76, 83
See application file for complete search history.

(56) References Cited

U.S. PATENT DOCUMENTS

| | | | |
|---|---|---|---|
| 2,502,790 A * | 4/1950 | Jencick | 464/73 |
| 4,037,431 A * | 7/1977 | Sugimoto | 464/73 |
| 4,655,728 A | 4/1987 | Shimada | |
| 4,703,840 A | 11/1987 | Bopp | |
| 4,750,872 A * | 6/1988 | Palliser | 417/423.11 |
| 4,861,240 A | 8/1989 | Marioni et al. | |
| 5,152,189 A * | 10/1992 | Miura et al. | 464/180 |
| 5,204,567 A | 4/1993 | Kinoshita et al. | |
| 5,569,022 A | 10/1996 | Rossi | |
| 5,668,425 A * | 9/1997 | Marioni et al. | 310/162 |
| 5,690,554 A * | 11/1997 | Imanaka et al. | 464/68.9 |
| 5,697,122 A * | 12/1997 | Okabe et al. | 16/82 |

(Continued)

FOREIGN PATENT DOCUMENTS
CA         1290980      11/1988
(Continued)

*Primary Examiner* — Devon C Kramer
*Assistant Examiner* — Nathan Zollinger
(74) *Attorney, Agent, or Firm* — Boyle Fredrickson, S.C.

(57) ABSTRACT

A pump assembly constructed to allow unloaded starting of the pump. The assembly includes a pump body, a permanent magnet rotor, a rotor shaft, a pump cover, a shaft sleeve and an impeller. The impeller includes a holding chamber for holding the shaft sleeve which is arranged proximate a center of the impeller. A stopping rib extends inwardly from an internal wall of the holding chamber of the impeller. The shaft sleeve includes a tubular body with a starting rib extending laterally from the body. During operation of the pump, the starting rib interferes with the stopping rib. A number of shock absorbing pads are disposed between the starting rib and the stopping rib and maintained thereat by a notch and ridge association that extends along each rib and pad. The pump includes a space that allows rotation of the starting rib relative to the stopping rib which provides unloaded starting of the pump.

13 Claims, 4 Drawing Sheets

U.S. PATENT DOCUMENTS

| | | | | |
|---|---|---|---|---|
| 5,873,786 | A * | 2/1999 | Hosoya et al. | 464/73 |
| 6,217,452 | B1 * | 4/2001 | Marioni | 464/74 |
| 6,265,799 | B1 * | 7/2001 | Uriarte | 310/103 |
| 6,384,508 | B1 * | 5/2002 | Marioni | 310/261.1 |
| 6,478,555 | B1 | 11/2002 | Kim et al. | |
| 6,875,112 | B2 * | 4/2005 | te Uhle et al. | 464/83 |
| 6,972,502 | B2 * | 12/2005 | Marioni | 310/75 R |
| 6,988,715 | B2 * | 1/2006 | Winter et al. | 254/278 |
| 7,033,145 | B2 * | 4/2006 | Iacocca | 417/325 |
| 7,097,434 | B2 * | 8/2006 | Marioni | 417/423.1 |
| 7,102,261 | B2 | 9/2006 | Vedovello | |
| RE39,481 | E * | 1/2007 | Marioni | 310/12.18 |
| 7,357,195 | B2 * | 4/2008 | Kamimura et al. | 173/216 |
| 2002/0122688 | A1 * | 9/2002 | Marioni | 403/43 |
| 2005/0111992 | A1 | 5/2005 | Iacocca | |

FOREIGN PATENT DOCUMENTS

| | | |
|---|---|---|
| CA | 1 247388 | 12/1988 |
| CA | 2000.346 | 10/1989 |
| CA | 2020585 | 7/1990 |
| CA | 2085112 | 4/1992 |
| CA | 2167356 | 1/1996 |
| CA | 2177242 | 5/1996 |
| CA | 2204071 | 4/1997 |
| CA | 2380.571 | 8/1998 |
| CA | 2 295 763 | 1/1999 |
| CA | 2 149 486 | 1/2002 |
| CA | 2363161 | 5/2002 |
| CA | 2349317 | 8/2002 |
| CA | 2 126 205 | 1/2003 |
| CA | 2459704 | 3/2003 |
| CA | 2456434 | 8/2004 |
| CA | 2 549 771 | 6/2006 |
| CA | 2474965 | 1/2007 |
| CA | 2474972 | 1/2007 |
| EP | 0 514 272 A1 | 5/1992 |
| EP | 514272 A1 * | 11/1992 |
| EP | 0 287 984 B1 | 10/1993 |
| EP | 1 396 641 B1 | 7/2006 |
| WO | WO 99/48189 | 9/1999 |

* cited by examiner

CENTRIFUGAL DRAINAGE PUMP WITH SHOCK ABSORBING COUPLING ARRANGMENT

CROSS-REFERENCE TO RELATED APPLICATIONS

This application is the U.S. National phase application corresponding to PCT/CN2006/001124 which was assigned an international filing date of May 29, 2006 and associated with publication WO 2007/085141 and which claims priority to Chinese Application 200620054699.0 filed on Jan. 26, 2006, the disclosures of which are expressly incorporated herein.

FIELD OF THE INVENTION

The present invention relates in general to a centrifugal draining pump, particularly being used in household electrical appliances and the like.

BACKGROUND OF THE PRESENT DISCLOSURE

A centrifugal draining pump of that type is described in a U.S. patent application Ser. No. 10/723,295 which published as publication number US2005/0111992. Pumps of the type generally disclosed in this publication were designed to solve the problem of the motor being easily burned out owing to heavy load during initial start-up of the pump. The major contribution of the invention is to improve the start-up coupling between a shaft sleeve and an impeller. As shown in the figures of the publication referred to above, a coupling formation of the rotor is set up on the drive body, and a coupling formation of the impeller is set up inside of the impeller. A pair of end portions that is constructed of resilient materials with intermediate connecting and retaining portions are molded onto two opposite surfaces of an appendage of the coupling formation of the drive body so as to reduce noise and absorb shock. However, such a configuration is quite complicated and suffers from higher costs of manufacture and maintenance.

SUMMARY OF THE PRESENT INVENTION

The present invention provides a centrifugal drainage pump having a rotor chamber and a pump cover chamber which are separated from one another. The rotor chamber includes a pump body, a permanent magnet rotor, a rotor shaft, a bearing, and a bearing seat. The pump cover chamber includes a pump cover with a water-inlet, a shaft sleeve, and an impeller provided with a holding chamber in its center for holding the shaft sleeve. The shaft sleeve of the pump is provided with a tubular body. A starting rib which is integral with the shaft sleeve extrudes outwardly from the tubular body. The impeller is provided with a stopping rib that projects inwardly from the internal wall of the holding chamber. The starting rib interferes with the stopping rib after it rotates in one direction or reversely for a certain distance among pairs of interference contact surfaces between the starting rib and the stopping rib.

At least one of each pair of interference contact surfaces has a recessed notch extending axially. The open-end of the notch is narrower than the inner space of the notch. A shock absorbing pad has a convex ridge extending from its side that contacts the interference contact surface. The convex ridge is embedded in the notch such that the pad tightly contacts with the stopping rib or the starting rib.

According to the said configuration, two interference contact surfaces of the starting rib are attached with the shock absorbing pad, two interference contact surfaces of the stopping rib are attached with the shock absorbing pad, or two interference contact surfaces of the starting rib and two interference contact surfaces of the stopping rib are attached with the shock absorbing pads.

The shaft sleeve is in the shape of an upside down letter "T". The upper part of the shaft sleeve is the tubular body in cylindrical shape and the lower part of which is an annular protruding platform.

The upper part of the impeller is arranged with a rotor shaft holding chamber fitting with the rotor shaft which passes through the shaft sleeve and fits into the rotor shaft holding chamber.

The centrifugal drainage pump according to the present invention provides a pump that can be started with no load thereby reducing heavy loaded start-up of the motor. The pump further allows solid contact between the shock absorbing pad and the starting rib or the stopping rib by inlaying the convex ridge of the shock absorbing pad into the notch with the narrow opening-end of the starting rib or the stopping rib. Such a configuration allows the shock absorbing pads to be quickly and efficiently installed and/or replaced.

Understandably, the aspects and advantages discussed above are not mutually exclusive to any particular aspect or embodiment of the present invention including the best mode as discussed below.

BRIEF DESCRIPTION OF THE DRAWINGS

FIG. 5a is a cross-sectional view of the impeller structure of the pump shown in FIG. 1.

FIG. 5b is the cross-sectional view of the impeller structure taken along line 5b-5b shown in FIG. 5a.

FIG. 6a is longitudinal view of a shock absorbing pad removed from the impeller structure shown in FIG. 5a.

FIG. 6b is a transverse view of the shock absorbing pad shown in FIG. 6a.

DETAILED DESCRIPTION

Figure 1:
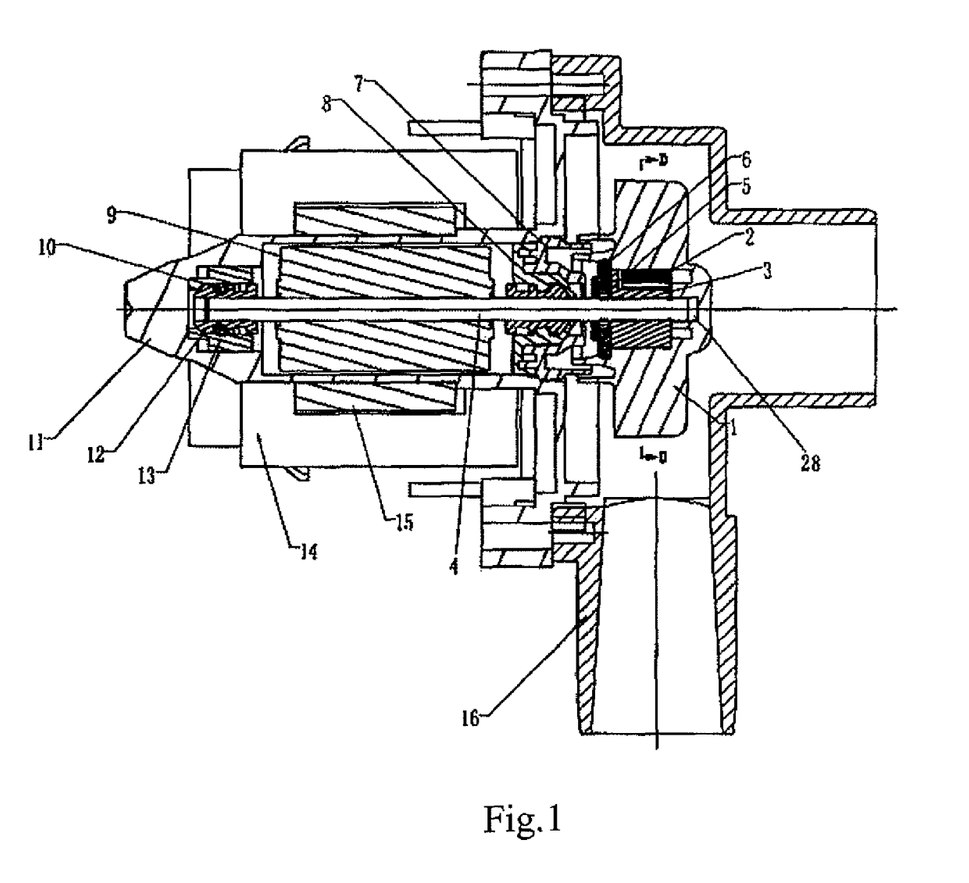
FIG. 1 is a cross-sectional view of a centrifugal drainage pump according to the present invention.

As shown in FIG. 1, similarly to the conventional centrifugal draining pump, the present centrifugal draining pump comprises a rotor chamber and a pump cover chamber which are mutually separated. The rotor chamber consists of a pump body 11, a permanent magnet rotor 9, a rotor shaft 4, bearing 12 and a bearing seat. The pump cover chamber consists of a pump cover 16 with a water-inlet, a shaft sleeve 3, an impeller 1, and an impeller washer 6. In the center of the impeller 1, there is a holding chamber 17 for holding the shaft sleeve 3 which is in the shape of an upside down letter "T". The annular impeller washer 6 is located below the holding chamber of the impeller, closes the holding chamber, and keeps the shaft sleeve 3 inside of it. A starting rib 18 is extruded or extends outwardly from the surface of the body of the shaft sleeve, whereas a stopping rib 19 is extruded or extends inwardly from the internal surface of the holding chamber of the impeller. After turning forward or backwards for a certain distance, the starting rib 18 interferes with the stopping rib 19.

One inventive point of the present invention rests in the start-up coupling between the shaft sleeve 3 and the impeller 1. The structure of these two components and their respective coupling is described further below.

Figure 3A:
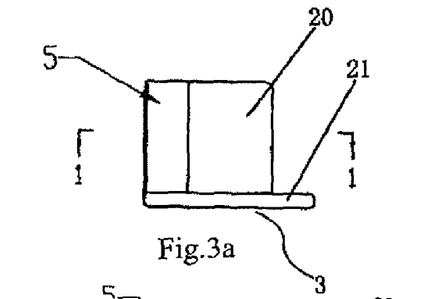
FIG. 3a is a front side elevational view of the shaft sleeve assembly shown in FIG. 1.
Figure 3B:
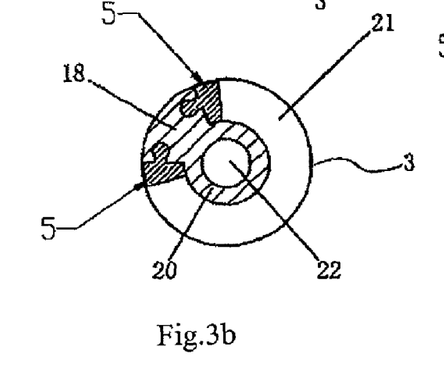
FIG. 3b is a cross-sectional view of the shaft sleeve assembly shown in FIG. 3a taken along line 1-1.

The structure of the shaft sleeve is shown in FIGS. 3a and 3b. The shaft sleeve 3 has a tubular body, in the bottom of which there is an annular protruding platform, so that it is in the shape of an upside down letter "T". A through-going hole 22 for holding the rotor shaft 4 is located in the center of the tubular body and the annular protruding platform. A starting rib 18 extrudes or extends radially and outwardly from the tubular body and is preferably molded integrally with the shaft sleeve 3. Preferably, the outside surface of the starting rib is a cambered surface that is flush with the annular protruding platform. Preferably, the left and right sides of the starting rib in a radial direction are generally straight flat surfaces. An axially extending notch 23 is recessed respectively on the both side surfaces of the starting rib. Preferably, the open end of the notch is narrower than its inner space. Two shock absorbing pads 5 are fitted onto the left and right side surfaces of the starting rib of the shaft sleeve respectively. The outside of the starting rib is also a cambered surface that is flush with the annular protruding platform, but the internal side of which fits surface of the tubular body.

Figure 4A:
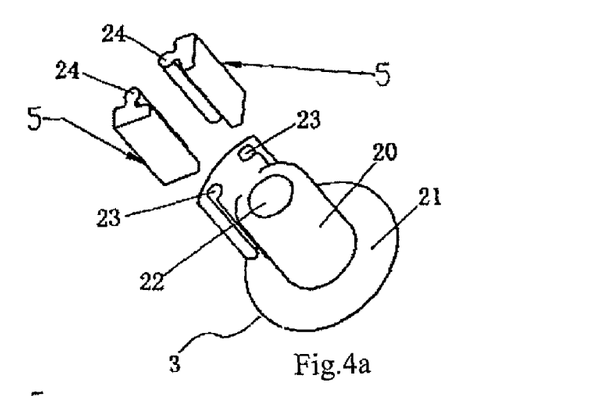
FIG. 4a is a perspective view of the shaft sleeve assembly shown in FIG. 3b with the shock absorbing pads exploded therefrom.
Figure 4B:
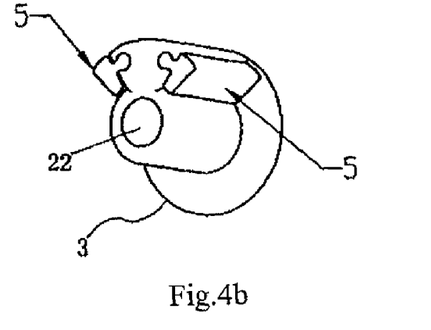
FIG. 4b is a perspective view of the shaft sleeve assembly shown in FIG. 4a with the shock absorbing pads engaged with the shaft sleeve.

As it is shown in FIGS. 4a and 4b, a convex ridge 24 is formed in a strip located on the contacting surface of the shock absorbing pads 5 and cooperates with the shaft sleeve for attaching pads 5 to the starting rib. Each convex ridge fits in a notch on a respective side of the starting rib. In this way, the convex ridge of shock absorbing pads 5 of the shaft sleeve can be inserted basipetally into the notch 23 along its axial direction. Because the outside part of the notch is narrower than its inner space, the shock absorbing pads 5 of the shaft sleeve cannot be separated from the notch in a generally transverse direction, so that the shock absorbing pads 5 of the shaft sleeve can tightly contact with the side surfaces.

Figures 5A, 5B, 6A, 6B:
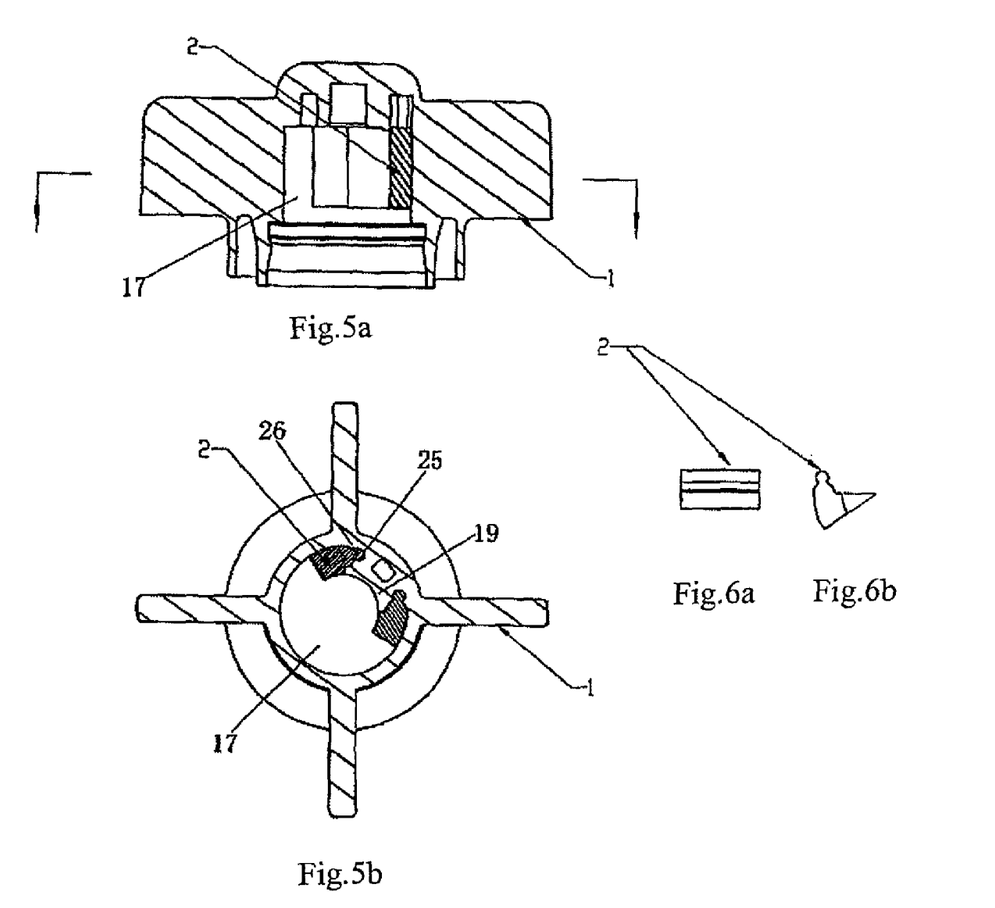

FIGS. 5a and 5b show sectional views of the impeller of the pump assembly. A cylindrical holding chamber 17 is arranged in the center of the impeller, and the diameter of the chamber 17 is generally equal to that of a protruding platform 21 of the shaft sleeve. A stopping rib 19 is extruded or extends inwardly from the internal wall of the holding chamber. The internal side of the stopping rib 19 has a cambered surface that is constructed to cooperate with the outside surface of the shaft sleeve body 20. The left and right sides of stopping rib 19 have flat perimeter surfaces. A notch 25 extending axially is recessed in each of these two surfaces. The open-end of the notch is narrower than inner space of the notch. Two shock absorbing pads 2 of the impeller are fitting respectively on the said two surfaces. FIGS. 6a and 6b show a representative pad 2 removed from impeller 1. The radially internal side of the shock absorbing pads 2 of the impeller 1 is a cambered surface configured to fit with the outside surface of the shaft sleeve body. A radially outside cambered surface is configured to be fitted with the internal wall of the shaft sleeve holding chamber 17. A convex ridge 26 extrudes or extends from the surface of the shock absorbing pad 2 of the impeller 1 that contacts with the stopping rib. The convex ridge 26 is coupled with the notch 25 located on either side of the stopping rib so as to form a close contact structure similar to that of the said shock absorbing pads 5 of the shaft sleeve with the side surface of the starting rib.

Figure 2:
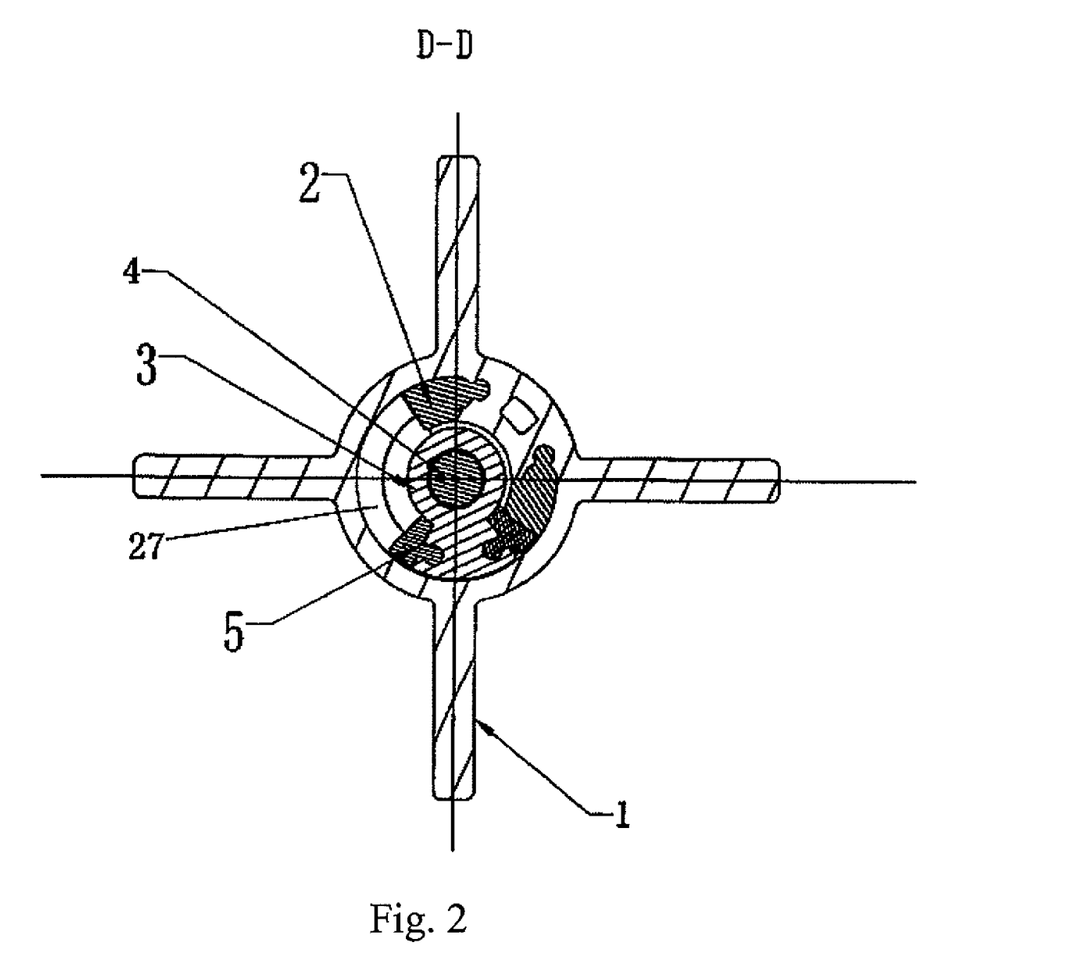
FIG. 2 is a cross-sectional view of the pump assembly taken along line D-D shown in FIG. 1.

Referring back to FIG. 2, after putting the shaft sleeve 3 into the holding chamber 17 of the impeller 1, there is an annular space 27 maintained between the stopping rib of the impeller and the starting rib of the shaft sleeve. The starting rib is allowed to rotate in this space 27. Therefore, when the electric motor starts, the shaft sleeve driven by a motor shaft interferes with the stopping rib of the impeller in order to drive the impeller only after the shaft sleeve has been driven a certain angle free of load. In this way, the problem of overload that occurs during pump start-up has been solved.

In order to improve the swing problem of the impeller 1, as shown in FIG. 1, a rotor shaft holding chamber 28 is formed on the top of impeller 1, and in which, the rotor shaft fits. The rotor shaft passing through the shaft sleeve is positioned into rotor shaft holding chamber 28.

One inventive point of the present invention focuses on the attaching structure of the shock absorbing pad. In the present embodiment, there are two pairs of interference contact surfaces between the starting rib and the stopping rib. One pair of interference contact surfaces is formed of the left side of the starting rib in the radial direction and the right side of the stopping rib in the radial direction. Another pair of interference contact surfaces is formed of the right side of the starting rib in the radial direction and left side of the stopping rib in the radial direction. Either shock absorbing pads can absorb impact generated between each pair of interference contact surfaces. Therefore, the above means to place the shock absorbing pad shall fall in the protection scope claimed in the present invention, regardless of whether the shock absorbing pads are placed on the interference contact surfaces of the starting rib or on the interference contact surfaces of the stopping rib, or as it is disclosed in the present invention, on both of the interference contact surfaces of the starting rib or on both of the interference contact surfaces of the stopping rib.

What is claimed is:

1. A centrifugal drainage pump, comprising:
a rotor chamber and a pump cover chamber which are separated from one another, wherein the rotor chamber includes a pump body, a permanent magnet rotor, a rotor shaft, a bearing, a bearing seat and an impeller washer being installed on the rotor shaft; and the pump cover chamber includes a pump cover with a water-inlet, a shaft sleeve and an impeller provided with a holding chamber in its center for holding the shaft sleeve; wherein
the shaft sleeve is provided with a tubular body, and a starting rib which is integral with the shaft sleeve that extends outwardly from the tubular body;
the impeller is provided with a stopping rib projecting inwardly from an internal wall of the holding chamber, and the starting rib interferes with the stopping rib after it rotates for a certain distance;
the impeller washer is arranged on one end of the shaft sleeve and located inside of the impeller and outside of the holding chamber;
the stopping rib of the impeller has a interference contact surface into which a notch extending axially is recessed and an open-end of the notch is narrower than an inner space of the notch; and
a shock absorbing pad having a convex ridge extending from its side that contacts with the interference contact surface, and the convex ridge can be embedded in the notch in order that the pad tightly contacts with the stopping rib and the convex ridge of the shock absorbing pad is integrated firmly with the notch of the stopping rib which prevents separation of the shock absorbing pad from the stopping rib under frequent impacts between the starting rib and the stopping rib during start-up of clockwise and counterclockwise rotation of the impeller.

2. A centrifugal drainage pump according to claim 1, wherein the impeller has a rotor shaft holding chamber being provided on a top portion of the impeller which is adjacent to the holding chamber and an opposite end of the shaft sleeve, and the rotor shaft passes through the shaft sleeve then is plugged into the rotor shaft holding chamber, so that an outside cylindrical surface of an end of the rotor shaft contacts directly with an inner surface of the rotor shaft holding chamber.

3. A centrifugal drainage pump according to claim 1, wherein the said shaft sleeve has an upside down letter "T" shape, the upper part of which is the tubular body and the lower part of which is an annular protruding platform.

4. A centrifugal drainage pump comprising:
a rotor chamber and a pump cover chamber which are separated from one another, wherein the rotor chamber includes a pump body, a permanent magnet rotor, a rotor shaft, a bearing, a bearing seat and an impeller washer being installed on the rotor shaft; and the pump cover chamber includes a pump cover with a water-inlet, a shaft sleeve and an impeller provided with a holding chamber in its center for holding the shaft sleeve; and wherein,
the shaft sleeve is provided with a tubular body, and a starting rib which is integral with the shaft sleeve extends outwardly from the tubular body;
the impeller is provided with a stopping rib projecting inwardly from an internal wall of the holding chamber, and the starting rib interferes with the stopping rib after it rotates for a certain distance,
the pump being characterized in that:
the impeller washer is arranged on one end of the shaft sleeve, and is located inside of the impeller and outside of the holding chamber;
the starting rib of the shaft sleeve has a interference contact surface in which a notch extending axially is recessed and an open-end of the notch is narrower than an inner space of the notch; and
a shock absorbing pad has a convex ridge extending from a side that contacts with the interference contact surface and the convex ridge can be embedded in the notch, in order that the pad tightly contacts with the starting rib and the convex ridge of the shock absorbing pad is integrated firmly with the notch of the starting rib which prevent separation of the shock absorbing pad from the stopping rib under frequent impacts between the starting rib and the stopping rib during start-up of clockwise and counterclockwise rotation of the impeller.

5. A centrifugal drainage pump according to claim 4, wherein the impeller has a rotor shaft holding chamber being provided on the top of the impeller and which is adjacent to the holding chamber and an opposite end of the shaft sleeve, and the rotor shaft passes through the shaft sleeve, then is plugged into the rotor shaft holding chamber, so that the end of an outside cylindrical surface of an end of the rotor shaft contacts directly with an inner surface of the rotor shaft holding chamber.

6. A centrifugal drainage pump according to claim 4, wherein the shaft sleeve has an upside down letter "T" shape wherein an upper part of which is the tubular body and a lower part of which is an annular protruding platform.

7. A centrifugal drainage pump comprising:
a rotor chamber and a pump cover chamber which are separated from one another, wherein the rotor chamber includes a pump body, a permanent magnet rotor, a rotor shaft, a bearing, a bearing seat and an impeller washer being installed on the rotor shaft; the pump cover chamber includes a pump cover with a water-inlet, a shaft sleeve and an impeller provided with a holding chamber in its center for holding the shaft sleeve; wherein,
the shaft sleeve is provided with a tubular body, and a starting rib which is integral with the shaft sleeve extrudes outwardly from the tubular body;
the impeller is provided with a stopping rib projecting inwardly from an internal wall of the holding chamber, and the starting rib interferes with the stopping rib after it rotates in an initial direction or in an opposite direction for a certain distance;
the pump being characterized in that:
the impeller washer is arranged on one end of the shaft sleeve and is located in the impeller and outside of the holding chamber;
the stopping rib of the impeller has a first interference contact surface in which a first notch extending axially is recessed and an open-end of the first notch is narrower than its inner space;
a first shock absorbing pad has a convex ridge extruding from its side that contacts with the first interference contact surface, and the convex ridge of the first shock absorbing pad can be embedded in the first notch so that the first shock absorbing pad tightly contacts with the stopping rib, and the convex ridge of the first shock absorbing pad is integrated firmly with the notch of the stopping rib which prevents separation of the first shock absorbing pad from the stopping rib under frequent impacts between the starting rib and the stopping rib during start-up of clockwise and counterclockwise rotation of the impeller;
the starting rib of the shaft sleeve has a second interference contact surface in which a second notch extending axially is recessed and an open-end of the second notch is narrower than its inner space; and
a second shock absorbing pad has a convex ridge extruding from a side that contacts with the second interference contact surface, and the convex ridge of the second shock absorbing pad can be embedded in the second notch so that the second shock absorbing pad tightly contacts with the starting rib, and the convex ridge of the second shock absorbing pad is integrated firmly with the notch of the starting rib, which prevents separation of the second shock absorbing pad from the starting rib under frequent impacts between the starting rib and the stopping rib during start-up of clockwise and counterclockwise rotation of the impeller.

8. A centrifugal drainage pump according to claim 7, wherein there is an annular space between the stopping rib of the impeller and the starting rib of the shaft sleeve.

9. A centrifugal drainage pump according to claim 7, wherein the impeller has a rotor shaft holding chamber being provided on the top of the impeller which is adjacent to an opposite end of the shaft sleeve, and the rotor shaft passes through the shaft sleeve, then is plugged into the rotor shaft holding chamber, so that an outside cylindrical surface of an end of the rotor shaft contacts directly with an inner surface of the rotor shaft holding chamber.

10. A centrifugal drainage pump according to claim 7, wherein the said shaft sleeve is an upside down letter "T" shape, the upper part of which is the cylindrical tubular body and the lower part of which is an annular protruding platform.

11. A centrifugal drainage pump according to claim 1, wherein the interference contact surface overlaps the convex ridge in at least two directions relative to a longitudinal and rotational axis of the shaft sleeve, and the stopping rib and the shock absorbing pad are non-uniformly distributed about a circumference associated with overlapping interaction areas between the starting rib and the stopping rib.

12. A centrifugal drainage pump according to claim 4, wherein the interference contact surface overlaps the convex ridge in at least two directions relative to a longitudinal and rotational axis of the shaft sleeve, and the stopping rib and the shock absorbing pad are non-uniformly distributed about a circumference associated with overlapping interaction areas between the starting rib and the stopping rib 13. A centrifugal drainage pump according to claim 7, wherein the first interference contact surface overlaps the convex ridge in at least two directions relative to a longitudinal and rotational axis of the shaft sleeve, and the stopping rib and the shock absorbing pad are non-uniformly distributed about a circumference associated with overlapping interaction areas between the starting rib and the stopping rib.

* * * * *

UNITED STATES PATENT AND TRADEMARK OFFICE
CERTIFICATE OF CORRECTION

PATENT NO.        : 8,057,199 B2
APPLICATION NO.   : 12/064402
DATED             : November 15, 2011
INVENTOR(S)       : Mingxue Li and Huashan Shi It is certified that error appears in the above-identified patent and that said Letters Patent is hereby corrected as shown below:

ON THE FACE

(73) Assignee:

Delete "Jiangmen Idear Hanyu Electrical (CN)" and substitute therefore -- Jiangmen Idear Hanyu Electrical Joint-Stock Co., Ltd (CN) --.

Signed and Sealed this
Thirteenth Day of March, 2012

David J. Kappos
*Director of the United States Patent and Trademark Office*